United States Patent
Xu et al.

(10) Patent No.: US 12,107,411 B2
(45) Date of Patent: Oct. 1, 2024

(54) MOTOR CONTROL SYSTEM AND VEHICLE

(71) Applicant: BYD COMPANY LIMITED, Guangdong (CN)

(72) Inventors: Luhui Xu, Shenzhen (CN); Yilong Yu, Shenzhen (CN); Zhiyong Du, Shenzhen (CN); Axi Qi, Shenzhen (CN); Guangming Yang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 199 days.

(21) Appl. No.: 17/943,878

(22) Filed: Sep. 13, 2022

(65) Prior Publication Data
US 2023/0006437 A1 Jan. 5, 2023

Related U.S. Application Data

(63) Continuation of application No. PCT/CN2021/081357, filed on Mar. 17, 2021.

(51) Int. Cl.
*H02H 7/08* (2006.01)
*B60L 3/00* (2019.01)
(Continued)

(52) U.S. Cl.
CPC .......... *H02H 7/0822* (2013.01); *B60L 3/0061* (2013.01); *H02H 7/0833* (2013.01); *H02P 6/08* (2013.01); *H02P 6/24* (2013.01)

(58) Field of Classification Search
CPC .. H02H 7/0822; H02H 7/0833; B60L 3/0061; H02P 6/08; H02P 6/24
(Continued)

(56) References Cited

U.S. PATENT DOCUMENTS 5,730,238 A 3/1998 Tamaki et al.
7,130,170 B2 10/2006 Wakefield
(Continued)

FOREIGN PATENT DOCUMENTS

CN 201022185 Y 2/2008
CN 101483404 A 7/2009
(Continued)

OTHER PUBLICATIONS

Nitta et al. (JP 2000166010 A) Controller for Hybrid Vehicle Date Published Jun. 16, 2000 (Year: 2000).*
(Continued)

*Primary Examiner* — Jorge L Carrasquillo
(74) *Attorney, Agent, or Firm* — Calfee, Halter & Griswold LLP

(57) ABSTRACT

A motor control system includes a main control unit, a power supply unit, and a driving unit. The main control unit obtains sampling data of a motor and a power supply signal from the driving unit, generates a motor control signal according to the sampling data, and outputs a safety enable signal when determining that motor drive is abnormal according to the sampling data or when determining that power supply to the driving unit is abnormal according to the power supply signal. The power supply unit supplies power to the main control unit, monitors a state of the main control unit, and outputs a safety cut-off signal when the power supply unit or the main control unit is abnormal. The driving unit drives the motor according to the motor control signal, and switches to a safe path when receiving any one of the safety enable or safety cut-off signal.

13 Claims, 3 Drawing Sheets

(51) Int. Cl.
*H02P 6/08* (2016.01)
*H02P 6/24* (2006.01)

(58) Field of Classification Search
USPC .......... 361/23; 318/563, 400.21, 400.22, 782
See application file for complete search history.

(56) References Cited

U.S. PATENT DOCUMENTS

| | | | |
|---|---|---|---|
| 9,463,697 | B1 | 10/2016 | Gauthier |
| 11,735,904 | B2 * | 8/2023 | Kishida .............. G01R 31/3275 361/23 |
| 2008/0111506 | A1 | 5/2008 | Muta et al. |
| 2014/0191700 | A1 | 7/2014 | Eberlein et al. |
| 2017/0272025 | A1 | 9/2017 | Jimbo et al. |
| 2022/0410718 | A1 * | 12/2022 | Xu ......................... B60L 15/20 |

FOREIGN PATENT DOCUMENTS

| | | |
|---|---|---|
| CN | 201976054 U | 9/2011 |
| CN | 202685982 U | 1/2013 |
| CN | 103050944 A | 4/2013 |
| CN | 103863122 A | 6/2014 |
| CN | 106208884 A | 12/2016 |
| CN | 106708003 A | 5/2017 |
| CN | 107340762 A | 11/2017 |
| CN | 107342715 A | 11/2017 |
| CN | 108681318 A | 3/2018 |
| CN | 107878258 A | 4/2018 |
| CN | 207853453 U | 9/2018 |
| CN | 108621798 A | 10/2018 |
| CN | 108696226 A | 10/2018 |
| CN | 110620543 A | 10/2018 |
| CN | 109263482 A | 1/2019 |
| CN | 110525232 A | 12/2019 |
| CN | 209949004 U | 1/2020 |
| CN | 110768213 A | 2/2020 |
| CN | 110808571 A | 2/2020 |
| DE | 102013008770 B3 | 10/2014 |
| JP | H 08318757 A | 12/1996 |
| JP | 2000102288 A | 4/2000 |
| JP | 2000166010 A | 6/2000 |
| JP | 2005161961 A | 6/2005 |
| JP | 2012060841 A | 3/2012 |
| JP | 2012205332 A | 10/2012 |
| JP | 2013132137 A | 7/2013 |
| JP | 2017169441 A | 9/2017 |
| WO | 200221675 A2 | 3/2002 |
| WO | 2002021675 A2 | 3/2002 |

OTHER PUBLICATIONS

Bayley et al. (CN 1060370 A) Automatic Flashover Protection for Locomotive Traction Motors Date Published Apr. 15, 1992 (Year: 1992).*
Jimbo et al. (CN 107204608 A) Motor Control Device Date Published Oct. 29, 2019 (Year: 2019).*
Zhang et al. (CN 201639272 U) A Power Source Protection Device Of Electric Machine Controller Date Published Nov. 1, 2010 (Year: 2010).*
Nishimiya et al. (DE 112017005417 T5) Electrical Work Machine Date Published Jul. 18, 2019 (Year: 2019).*
Xiong et al. (CN 103050944) A Traction Motor Controller Of Electric Automobile Date Published Apr. 22, 2015 (Year: 2015).*
Chen et al.(CN 108696226 A) A Motor Controller Date Published Oct. 23, 2018 (Year: 2018).*
English Translation of International Search Report from PCT/CN2021/081357 dated Jun. 15, 2021 (2 pages).
English Translation of International Search Report from PCT/CN2021/077946 dated Apr. 14, 2021 (2 pages).

* cited by examiner

MOTOR CONTROL SYSTEM AND VEHICLE

CROSS-REFERENCE TO RELATED APPLICATIONS

The present disclosure is a bypass continuation application for International Application PCT/CN2021/081357, filed on Mar. 17, 2021, which claims priority to Chinese Patent Application No. "202010188480.4", filed by BYD Company Limited on Mar. 17, 2020 and entitled "MOTOR CONTROL SYSTEM AND VEHICLE", the content of which is incorporated herein by reference in its entirety.

FIELD

The present disclosure relates to a motor control system, and a vehicle including the motor control system.

BACKGROUND

Currently, the development of electric vehicles becomes increasingly rapid. Power sources of pure electric vehicles are basically motor drive, and hybrid vehicles also have a motor-driven system. In the application field of vehicles, for motor-driven control, safety, and reliability are further considered in addition to functional performance, to avoid the occurrence of an unexpected state.

SUMMARY

A first aspect of the disclosure provides a motor control system, which includes a main control unit, a power supply unit, and a driving unit. The main control unit is configured to: obtain sampling data of a motor and a power supply signal from the driving unit, generate a motor control signal according to the sampling data, and output a safety enable signal when determining that motor drive is abnormal according to the sampling data or when determining that power supply to the driving unit is abnormal according to the power supply signal. The power supply unit is configured to: supply power to the main control unit, monitor a state of the main control unit, and output a safety cut-off signal when the power supply unit or the main control unit is abnormal. The driving unit is configured to: drive the motor according to the motor control signal, and switch to a safe path when receiving any one of the safety enable signal or the safety cut-off signal.

A second aspect of the disclosure provides a vehicle, which includes a motor and the foregoing motor control system. The motor control system is configured to drivingly control the motor.

The additional aspects and advantages of the present disclosure will be set forth in part in the description below, parts of which will become apparent from the description below, or will be understood by the practice of the present disclosure.

BRIEF DESCRIPTION OF THE DRAWINGS

The foregoing and/or additional aspects and advantages of the present disclosure become obvious and easily understood in descriptions of the embodiments with reference to the following accompanying drawings.

DETAILED DESCRIPTION

Figure 1:
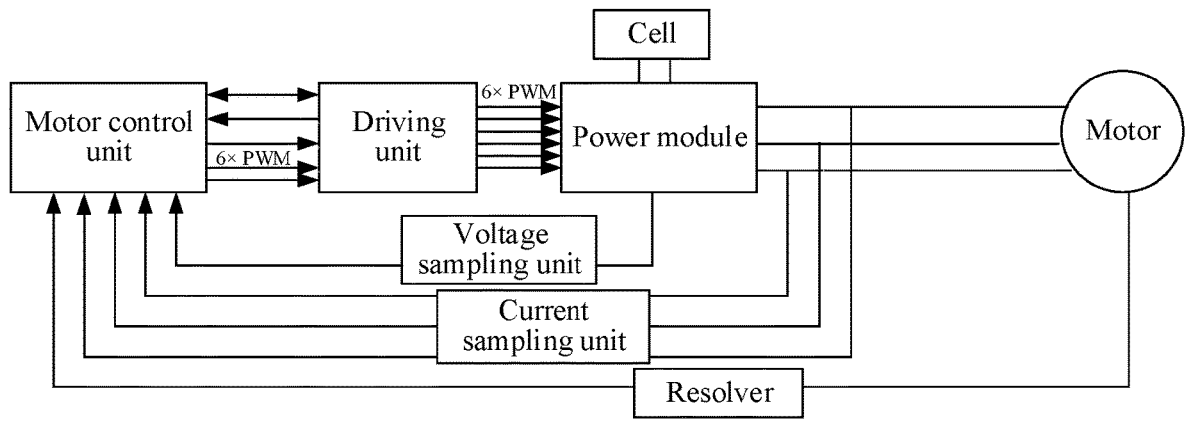
FIG. 1 is a schematic diagram of a topology structure of a motor control system in the related art.

In a design process of a motor controller unit, there are generally more solutions considering functions and performance, while the safety design of the motor controller unit is inadequate.

Detail description of embodiments of the present disclosure will be made in the following, and examples thereof are illustrated in the accompanying drawings, throughout which identical or similar elements or elements of identical or similar functions are represented with identical or similar reference numerals. The following embodiments described with reference to the accompanying drawings are exemplary, and are intended to describe the present disclosure and cannot be construed as a limitation to the present disclosure.

FIG. 1 is a schematic diagram of a typical topology structure of a motor drive system in the related art. In an application scenario of an electric vehicle, the system integration reliability and system safety need to be considered in a motor control system. However, in a conventional solution shown in FIG. 1, due to lack of monitoring of a control signal, lack of tracking and monitoring of a safety target, lack of a reliable turn-off path in a design process, and inappropriate division of functional independence, the application of a conventional motor control system in the electric vehicle cannot reach a higher safety level.

A motor control system according to an embodiment of the present disclosure is described below with reference to FIG. 2 to FIG. 5.

Figure 2:
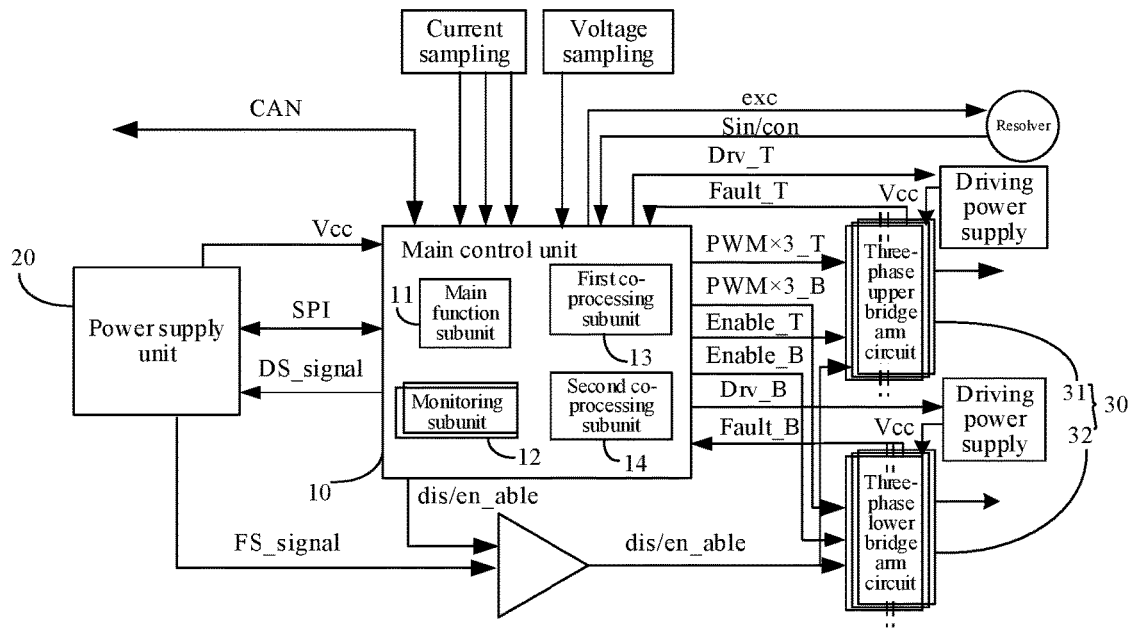
FIG. 2 is a schematic diagram of a topology structure of a motor control system according to an embodiment of the present disclosure.

FIG. 2 is a schematic diagram of a topology structure of a motor control system according to an embodiment of the present disclosure. As shown in FIG. 2, a motor control system 1 in the embodiment of the present disclosure includes a main control unit 10, a power supply unit 20, and a driving unit 30.

The main control unit 10 is configured to: obtain sampling data of a motor and a power supply signal from the driving unit 30, generate a motor control signal according to the sampling data, and output a safety enable signal when determining that motor drive is abnormal according to the sampling data or when determining that power supply to the driving unit 30 is abnormal according to the power supply signal.

The sampling data may include current sampling data, voltage sampling data, motor angle data, and the like. The main control unit 10 performs torque monitoring according to the sampling data, to determine whether the motor operates according to a safety target torque. If the two are inconsistent, it is considered that the motor drive is abnormal, and the safety enable signal such as a signal dis/en_able is outputted to the driving unit 30. In addition, the main control unit 10 also monitors the power supply to the driving unit 30, and sends the safety enable signal to the driving unit 30 when the power supply is abnormal, for example, when supplied power is excessively high.

The power supply unit 20 is configured to: supply power to the main control unit 10, for example, to supply Vcc to a low-voltage part of the main control unit 10, and monitor a state of the main control unit 10. The power supply unit 20 may communicate with the main control unit 10 through a serial peripheral interface (SIP). The power supply unit 20 outputs a safety cut-off signal such as an FS_signal to the driving unit 30 when the power supply unit 20 or the main control unit 10 is abnormal. Specifically, as shown in FIG. 1, the power supply unit 20 may provide an independent power supply domain for low-voltage power supply to the main control unit 10, and monitor the main control unit 10 through a signal DS_signal. If a fault occurs in the main control unit 10, the power supply unit 20 may send the safety cut-off signal to the driving unit 30 through the signal FS_signal.

The driving unit 30 is configured to: drive the motor according to the motor control signal, and switch to a safe path when receiving any one of the safety enable signal or the safety cut-off signal. A power supply source part of the driving unit 30 is monitored by the main control unit 10. Once the power supply is abnormal, the main control unit 10 cuts off the power supply to the driving unit 30, and switches the driving unit 30 to the safe path. The driving unit 30 includes a three-phase upper bridge arm circuit 31 and a three-phase lower bridge arm circuit 32, and may stop outputting a driving signal when being switched to the safe path. That is, six power units such as an insulated gate bipolar transistor (IGBT) are turned off, or a three-phase bridge arm is short-circuited, so that the motor can be in a safe state when the drive is abnormal.

In the motor control system 1 according to the embodiment of the present disclosure, the motor drive and the power supply to the driving unit 30 are monitored through the main control unit 10, and the state of the main control unit 10 is monitored through the power supply unit 20. That is, multiple monitoring mechanisms are arranged, and the driving unit 30 switches to the safe path when receiving any one of the safety cut-off signal and the safety enable signal. That is, multiple safety cut-off paths are added, to enable the motor to be in a safe state when the motor drive is abnormal, thereby improving the safety level of motor control.

In some embodiments, the sampling data may include at least one of a motor rotation speed or a bus voltage. The main control unit 10 controls the driving unit 30 to switch to the safe path according to the sampling data when the motor drive is abnormal. When an absolute value of a difference between the motor rotation speed and a preset rotation speed is less than a set rotation speed difference, or when an absolute value of a difference between the bus voltage and a preset voltage is less than a set voltage difference, all six driving power units of the driving unit 30 are controlled to be turned off.

Alternatively, when an absolute value of a difference between the motor rotation speed and a preset rotation speed is greater than or equal to a set rotation speed difference, or when an absolute value of a difference between the bus voltage and a preset voltage is less than or equal to a set voltage difference, it is further determined whether the three-phase upper bridge arm circuit of the driving unit 30 is faulty, and if yes, the three-phase upper bridge arm circuit 31 is controlled to be short-circuited, or if not, the three-phase lower bridge arm circuit 32 of the driving unit is controlled to be short-circuited.

Specifically, the driving unit 30 may be controlled by the main control unit 10 and the power supply unit 20. In a normal control state, the main control unit 10 enables the driving unit 30, and the driving unit 30 receives a signal PWM from the main control unit 10, to drive the power units, that is, the three-phase upper bridge arm circuit 31 and the three-phase lower bridge arm circuit 32. When detecting an abnormality, the main control unit 10 may send the signal dis/en_able, to switch the driving unit 30 to the safe path. In this case, according to bus voltage sampling or the motor rotation speed, it is determined whether to enter a state in which six driving units reliably turn off the IGBT, or enter a three-phase active short-circuit state.

Figure 3:
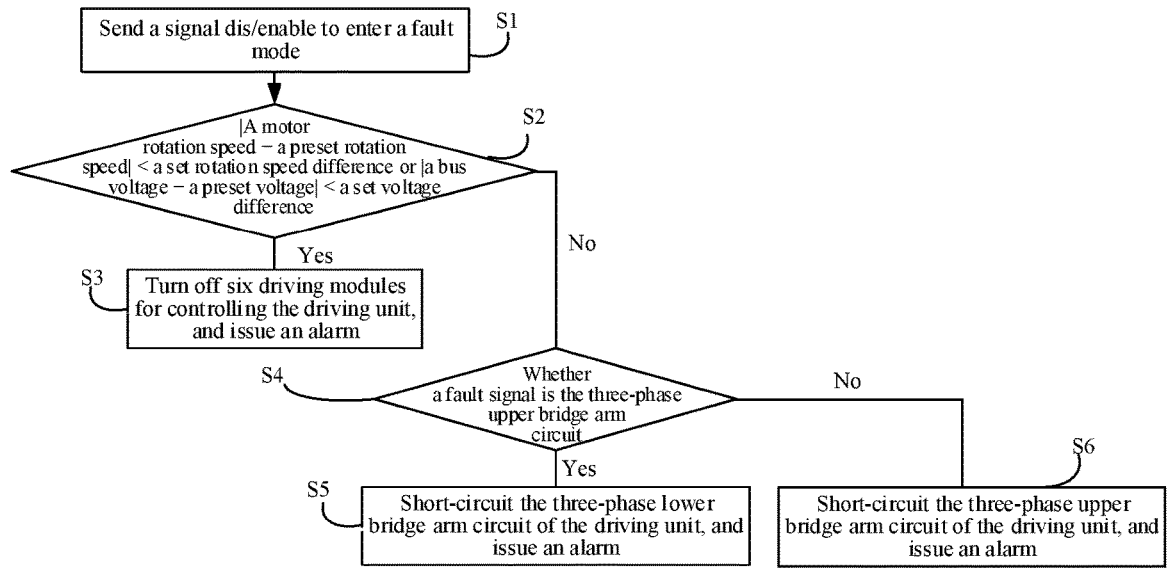
FIG. 3 is a flowchart of controlling a driving unit to be switched to a safe path according to an embodiment of the present disclosure.

FIG. 3 is a flowchart of controlling a driving unit by a main control unit to enter a safe path according to an embodiment of the present disclosure. Specifically, the following steps S1 to S6 are included.

S1. A signal dis/enable is sent to enter a fault mode.

S2. It is determined whether |a motor rotation speed−a preset rotation speed|<a set rotation speed difference or |a bus voltage−a preset voltage|<a set voltage difference is satisfied. If yes, step S3 is performed, or otherwise, step S4 is performed.

S3. Six driving modules for controlling the driving unit are turned off, and an alarm is issued.

S4. It is determined whether a fault signal is the three-phase upper bridge arm circuit, and if yes, step S5 is performed, or otherwise step S6 is performed.

S5. The three-phase lower bridge arm circuit of the driving unit is short-circuited, and an alarm is issued.

S6. The three-phase upper bridge arm circuit of the driving unit is short-circuited, and an alarm is issued.

In addition, the main control unit 10 monitors the power supply to the driving unit 30. When the power supply to the driving unit 30 is abnormal, the main control unit 10 controls all the six driving power units of the driving unit 30 to be turned off, so that the motor enters the safe state.

In addition, the power supply unit 20 receives state information sent by the main control unit 10, and monitors the main control unit 10 through, for example, a signal DS_signal. When the power supply unit 20 or the main control unit 10 is abnormal, the power supply unit 20 controls all the six driving power units of the driving unit 30 to be turned off, so that the motor enter the safe state.

Therefore, in the motor control system 1 in the embodiment of the present disclosure, multi-way monitoring is implemented through the main control unit 10 and the power supply unit 20, and the motor is enabled to enter the safe state when drive is abnormal.

In the embodiment of the present disclosure, the main control unit 10 may adopt multi-chip processing or multi-core processing, to implement monitoring and various diagnosis of a signal and a control target, thereby controlling the motor in a more comprehensive and reliable manner. In the embodiment, the main control unit 10 includes multiple control subunits, and the multiple control subunits are multiple control cores or multiple processing chips.

Figure 4:
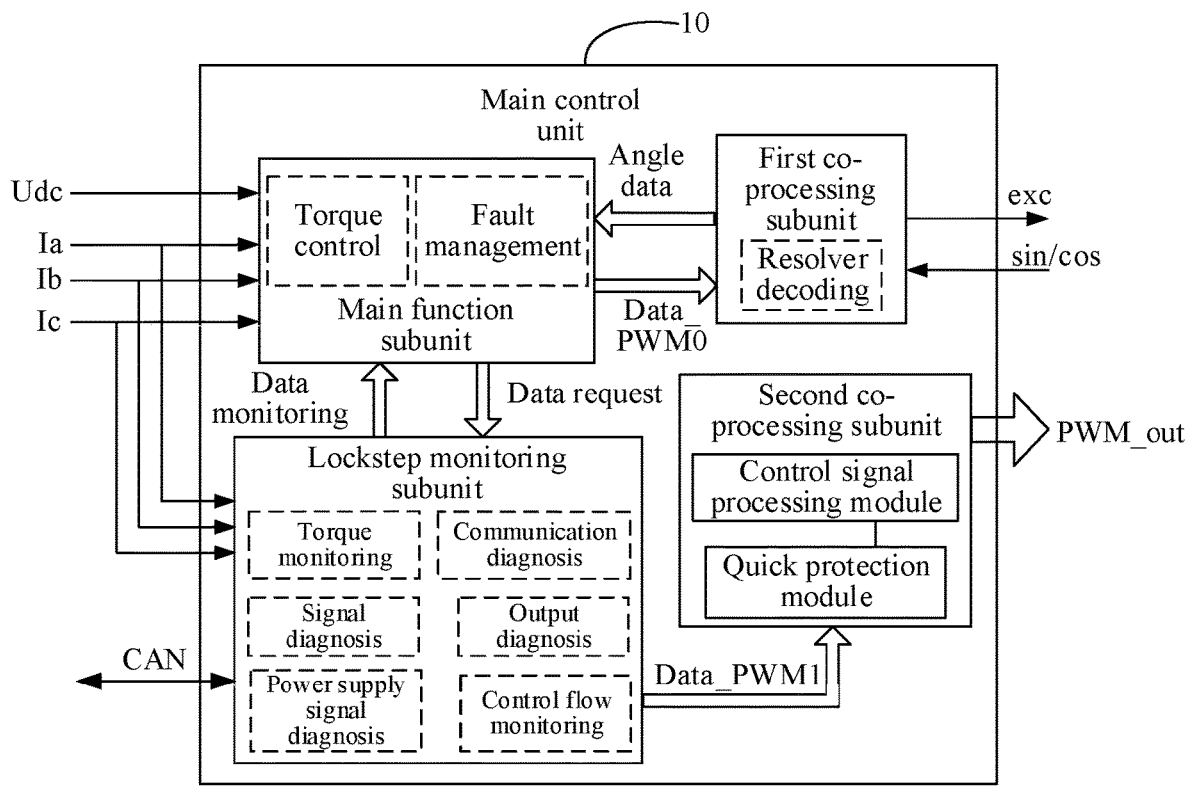
FIG. 4 is a schematic diagram of an internal structure of a main control unit according to an embodiment of the present disclosure.

Further, as shown in FIG. 2 or FIG. 4, the multiple control subunits include at least a main function subunit 11 and a monitoring subunit 12. The main function subunit 11 is configured to: obtain the sampling data such as three-phase currents Ia, Ib, and Ic, a voltage Udc, and angle data of the motor, and generate the motor control signal according to the sampling data of the motor. During normal drive, the driving unit 30 may drive the motor according to the motor control signal. Specifically, the main function subunit 11 mainly implements content such as torque control and fault management, for example, simultaneously inputs process data into the monitoring subunit 12. The monitoring subunit 12 is configured to: perform information diagnosis, generate diagnostic information, and obtain the process data of the main function subunit 11, to monitor a state of the main function subunit, that is, to perform control flow monitoring. Specifically, as shown in FIG. 4, the monitoring subunit 12 mainly implements functions such as torque monitoring, fault diagnosis, signal diagnosis, communication diagnosis, and output diagnosis.

Descriptions are made by using an example in which the main control unit 10 uses multiple control cores. The main control unit 10 includes at least two control cores. One control core is configured to be responsible for implementing a main function, and may be, for example, referred to as a main function core (the main function subunit 11). During the normal drive, the main function core generates the motor control signal according to the sampling data, to control the driving unit 30. Another control core is configured to be responsible for monitoring the control target, and may be, for example, referred to as a lockstep monitoring core (the monitoring subunit 12). The control core preferentially has a lockstep function, and the lockstep monitoring core simultaneously monitors a signal required in the main function core.

In the embodiment, the sampling data may include the motor angle data, and the multiple control subunits further include a first co-processing subunit 13. The first co-processing subunit 13 is configured to: perform resolver decoding on the motor angle data, to obtain an angle required for controlling the motor, and transmit the motor angle data to the main function subunit 11. Specifically, as shown in FIG. 2 or FIG. 4, the first co-processing subunit 13 mainly performs the resolver decoding, outputs an excitation signal exc to a resolver sensor, and then performs demodulation on a signal sin/cos from the resolver sensor, to obtain the angle required for controlling the motor.

In the embodiment, the monitoring subunit 12 is further configured to generate a motor safety control signal according to the diagnostic information, enable or disable control information, and control information enabling the motor to be in a safe state. The multiple control subunits further include a second co-processing subunit 14. The second co-processing subunit 14 is configured to: determine a motor drive state according to the sampling data, and output a final motor control signal according to the motor control signal outputted by the main function subunit 11, the motor safety control signal outputted by the monitoring subunit 12, and the motor drive state.

Further, the second co-processing subunit 14 includes a quick protection module 141 and a control signal processing module 142. The quick protection module 141 is configured to determine the motor drive state according to the sampling data, for example, to perform processing such as quick turn-off when it is determined that the drive is faulty according to a sampled current, voltage, resolver signal, and the like, so that the motor is in the safe state when a fault occurs. The control signal processing module 142 is configured to: when the motor drive is normal, use the motor control signal from the main function subunit 11 as the final motor control signal, and control the motor to operate according to a motor control signal PWM0 from the main function subunit 11, for example, to output PWM×3_T to the three-phase upper bridge arm circuit and output PWM×3_B to the three-phase lower bridge arm circuit; or when the motor drive is abnormal, use a motor safety control signal PWM1 from the monitoring subunit 12 as the final motor control signal, and further control the driving unit 30 to switch to the safe path according to the sampling data.

Specifically, as shown in FIG. 4, the second co-processing subunit 14 mainly performs processing on the final motor control signal such as the PWM. The main function subunit 11 calculates, through an inputted current signal, voltage signal, and position signal, and by using a motor control algorithm, the PWM required for obtaining normal control, for example, outputs Data_PWM0. The monitoring subunit 12 outputs PWM1 according to the diagnostic information, outputted PWM enable and disable information, and PWM information enabling the motor to be in the safe state. That is, when there are a fault and an enable output control signal, the monitoring subunit 12 outputs a safety control signal, that is, a signal Data_PWM1 enabling the motor to run safely. The quick protection module 141 performs processing such as quick turn-off based on fault information such as a current, a voltage, and resolver obtained through sampling, so that the motor is in the safe state when a fault occurs in it. The control signal processing module 142 integrates Data_PWM0, Data_PWM1, and processing information of the quick protection module 141 to process a finally outputted PWM_out waveform, and controls, according to the bus voltage sampling or the motor rotation speed, the driving unit 30 to switch to the safe path when there is a fault.

Figure 5:
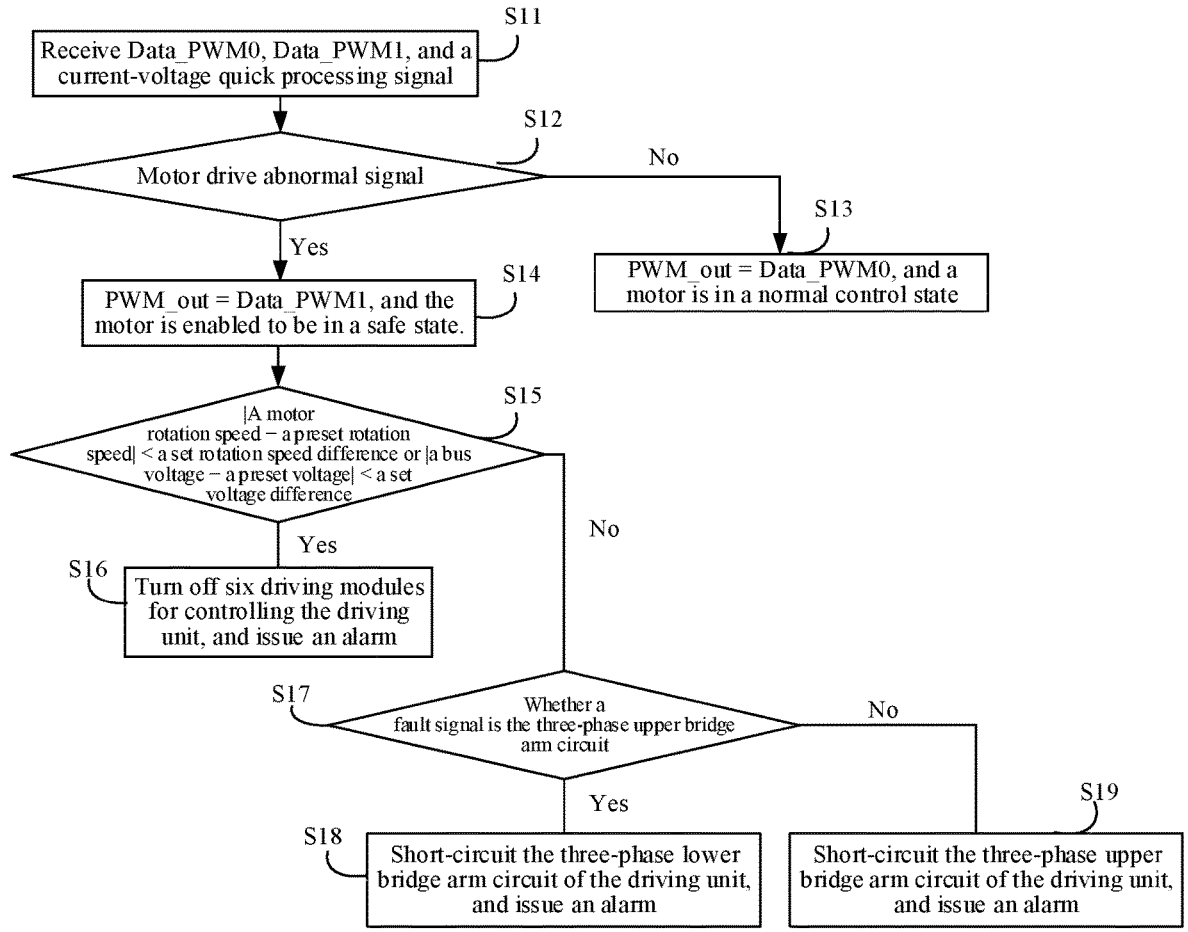
FIG. 5 is a flowchart of processing a control signal and controlling a driving unit to be switched to a safe path according to an embodiment of the present disclosure.

FIG. 5 is a flowchart of a process of performing PWM waveform processing by the control signal processing module 142 according to an embodiment of the present disclosure. The process includes the following steps.

S11. Data_PWM0, Data_PWM1, and a current-voltage quick processing signal are received.

S12. It is diagnosed whether there is a motor drive abnormal signal, and if yes, step S14 is performed, or otherwise, step S13 is performed.

S13. PWM_out=Data_PWM0, and a motor is in a normal control state.

S14. PWM_out=Data_PWM1, and the motor is enabled to be in a safe state.

S15. It is determined whether |a motor rotation speed−a preset rotation speed|<a set rotation speed difference or |a bus voltage−a preset voltage|<a set voltage difference is satisfied. If yes, step S16 is performed, or otherwise, step S17 is performed.

S16. Six driving modules for controlling the driving unit are turned off, and an alarm is issued.

S17. It is determined whether a fault signal is the three-phase upper bridge arm circuit, and if yes, step S18 is performed, or otherwise, step S19 is performed.

S18. The three-phase lower bridge arm circuit of the driving unit is short-circuited, and an alarm is issued.

S19. The three-phase upper bridge arm circuit of the driving unit is short-circuited, and an alarm is issued.

In the motor control system 1 of the embodiment of the present disclosure, the main control unit 10 uses the multiple control cores and the multiple processing chips, monitors the main function subunit 11 through the monitoring subunit 12, and optimizes a control function through the second co-processing subunit 14. That is, the control function is optimized and integrated, which helps improve the safety level.

Further, as shown in FIG. 2, in the embodiment, various power units of the driving unit 30 may supply power independently. For example, the motor control system 1 includes two driving power supplies, and the two driving power supplies supply power Vcc to the three-phase upper bridge arm circuit 31 and the three-phase lower bridge arm circuit 32 of the driving unit 30 respectively; or, the motor control system 1 includes six driving power supplies, and the six driving power supplies supply power to the six driving power units of the three-phase upper bridge arm circuit and the three-phase lower bridge arm circuit of the driving unit 30 respectively. Therefore, the power supply can supply power independently.

In summary, in the motor control system 1 of the embodiment of the present disclosure, an improved diagnostic mechanism is added, and the control function is optimized and integrated through multi-layer monitoring. Multiple layers of power cut-off paths are added to the motor control system 1. In addition, an independent power supply system is used, and the signal and the control target are monitored, to ensure the safety of power output, enable an electronic control system to be more reliable, and significantly improve the safety level of motor control, thereby ensuring the safe operation of a vehicle.

Based on the motor control system in the foregoing embodiment, a vehicle according to an embodiment of a second aspect of the present disclosure is described with reference to the accompanying drawings.

Figure 6:
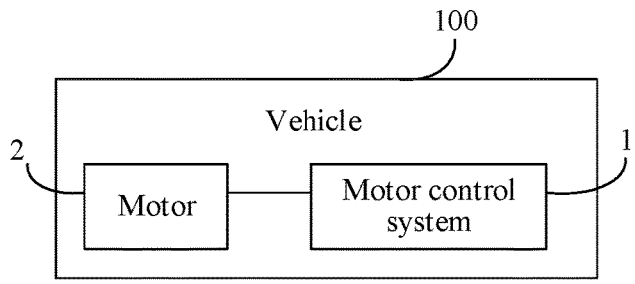
FIG. 6 is a block diagram of a vehicle according to an embodiment of the present disclosure.

FIG. 6 is a block diagram of a vehicle according to an embodiment of the present disclosure. As shown in FIG. 6, a vehicle 100 in the embodiment of the present disclosure includes a motor 2 and the motor control system 1 in the foregoing embodiments. The motor control system 1 controls the motor 2, to improve a safety level of the vehicle. For the structure and safety design of the motor control system 1, reference may be made to the descriptions of the foregoing embodiments.

In the vehicle 100 according to the embodiment of the present disclosure, the safety level of the control of the motor 2 can be improved by using the motor control system 1 in the foregoing embodiment, and therefore the safety can be improved.

In the description of the present disclosure, it should be understood that, orientations or position relationships indicated by terms such as "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure.

In addition, terms "first" and "second" are used merely for the purpose of description, and shall not be construed as indicating or implying relative importance or implying a quantity of indicated technical features. Therefore, features defining "first" and "second" may explicitly or implicitly include one or more such features. In the descriptions of the present disclosure, unless otherwise explicitly specified, "multiple" means two or more than two.

In the present disclosure, unless expressly stated and defined otherwise, the terms "mounting", "connected", "connection", "fixed", etc. are to be construed broadly, for example, as fixed connection, detachable connection or integral connection, as mechanical connection or electrical connection, and as direct connection or indirect connection via an intermediary or communication inside two elements or interaction between two elements. The specific meanings of the above terms in the present disclosure may be understood according to specific circumstances for a person of ordinary skill in the art.

In the present disclosure, unless otherwise explicitly specified and defined, the first feature is "on" or "below" the second feature may mean that the first feature and the second feature are in direct contact, or the first feature and the second feature are in indirect contact through an intermediate medium. Moreover, the first feature "over", "above" and "up" the second feature may be that the first feature is directly above or obliquely above the second feature, or simply indicates that a horizontal height of the first feature is higher than that of the second feature. That the first feature is "below", "under", and "beneath" the second feature may be that the first feature is directly below or obliquely below the second feature, or may merely indicate that the horizontal position of the first feature is lower than that of the second feature.

In the description of this specification, the description of reference terms such as "one embodiment", "some embodiments", "example", "specific example" or "some examples" means that specific features, structures, materials or characteristics described in combination with the embodiment or example are included in at least one embodiment or example of the present disclosure. In this specification, exemplary descriptions of the foregoing terms do not necessarily refer to a same embodiment or example. Besides, the specific features, the structures, the materials or the characteristics that are described may be combined in proper manners in any one or more embodiments or examples. In addition, a person skilled in the art may integrate or combine different embodiments or examples described in the specification and features of the different embodiments or examples as long as they are not contradictory to each other.

Although the embodiments of the present disclosure have been shown and described above, it can be understood that, the foregoing embodiments are exemplary and should not be understood as limitation to the present disclosure. A person of ordinary skill in the art can make changes, modifications, replacements, or variations to the foregoing embodiments within the scope of the present disclosure.

What is claimed is:

1. A motor control system, comprising a main control unit, a power supply unit, and a driving unit, wherein
the main control unit is configured to: obtain sampling data of a motor and a power supply signal from the driving unit, generate a motor control signal according to the sampling data, and output a safety enable signal when determining that motor drive is abnormal according to the sampling data or when determining that power supply to the driving unit is abnormal according to the power supply signal;
the power supply unit is configured to: supply power to the main control unit, monitor a state of the main control unit, and output a safety cut-off signal when the power supply unit or the main control unit is abnormal; and
the driving unit is configured to: drive the motor according to the motor control signal, and switch to a safe path when receiving any one of the safety enable signal or the safety cut-off signal;
wherein the main control unit comprises a plurality of control subunits, the plurality of control subunits comprising:

a main function subunit configured to obtain the sampling data of the motor and generate the motor control signal according to the sampling data of the motor;

a monitoring subunit configured to perform information diagnosis, generate diagnostic information, obtain process data of the main function subunit to monitor a state of the main function subunit, generate a motor safety control signal according to the diagnostic information, enable or disable control information, and control information enabling the motor to be in a safe state; and a first co-processing subunit configured to determine a motor drive state according to the sampling data and output a final motor control signal according to the motor control signal output by the main function subunit, the motor safety control signal output by the monitoring subunit, and the motor drive state.

2. The motor control system according to claim 1, wherein the sampling data comprises at least one of a motor rotation speed or a bus voltage, and the main control unit controls the driving unit to switch to the safe path according to the sampling data when the motor drive is abnormal, wherein when an absolute value of a difference between the motor rotation speed and a preset rotation speed is less than a set rotation speed difference, or when an absolute value of a difference between the bus voltage and a preset voltage is less than a set voltage difference, all six driving power units of the driving unit are controlled to be turned off.

3. The motor control system according to claim 2, wherein the main control unit controls all the six driving power units of the driving unit to be turned off when the power supply to the driving unit is abnormal, and the power supply unit controls all the six driving power units of the driving unit to be turned off when the power supply unit or the main control unit is abnormal.

4. The motor control system according to claim 3, wherein the plurality of control subunits are a plurality of control cores or a plurality of processing chips.

5. The motor control system according to claim 4, wherein the sampling data comprises motor angle data, and the plurality of control subunits further comprise a second co-processing subunit, wherein the second co-processing subunit is configured to perform resolver decoding on the motor angle data to obtain an angle required for controlling the motor.

6. The motor control system according to claim 1, wherein the main control unit controls all the six driving power units of the driving unit to be turned off when the power supply to the driving unit is abnormal, and the power supply unit controls all the six driving power units of the driving unit to be turned off when the power supply unit or the main control unit is abnormal.

7. The motor control system according to claim 1, wherein the plurality of control subunits are a plurality of control cores or a plurality of processing chips.

8. The motor control system according to claim 7 wherein the sampling data comprises motor angle data, and the plurality of control subunits further comprise a second co-processing subunit, wherein the second co-processing subunit is configured to perform resolver decoding on the motor angle data to obtain an angle required for controlling the motor.

9. The motor control system according to claim 8, wherein the first co-processing subunit comprises:

a quick protection module, configured to determine the motor drive state according to the sampling data; and a control signal processing module, configured to: when the motor drive is normal, use the motor control signal from the main function subunit as the final motor control signal, and control the motor to operate according to the motor control signal from the main function subunit; or, when the motor drive is abnormal, use the motor safety control signal from the monitoring subunit as the final motor control signal, and control the driving unit to switch to the safe path according to the sampling data.

10. The motor control system according to claim 1, wherein the motor control system comprises two driving power supplies, and the two driving power supplies supply power to a three-phase upper bridge arm circuit and a three-phase lower bridge arm circuit of the driving unit respectively; or the motor control system comprises six driving power supplies, and the six driving power supplies supply power to the six driving power units of the three-phase upper bridge arm circuit and the three-phase lower bridge arm circuit of the driving unit respectively.

11. A vehicle, comprising a motor and the motor control system according to claim 1, wherein the motor control system is configured to drivingly control the motor.

12. The motor control system according to claim 1, wherein the first co-processing subunit comprises:

a quick protection module, configured to determine the motor drive state according to the sampling data; and a control signal processing module, configured to: when the motor drive is normal, use the motor control signal from the main function subunit as the final motor control signal, and control the motor to operate according to the motor control signal from the main function subunit; or, when the motor drive is abnormal, use the motor safety control signal from the monitoring subunit as the final motor control signal, and control the driving unit to switch to the safe path according to the sampling data.

13. The motor control system according to claim 12, wherein the motor control system comprises two driving power supplies, and the two driving power supplies supply power to a three-phase upper bridge arm circuit and a three-phase lower bridge arm circuit of the driving unit respectively; or the motor control system comprises six driving power supplies, and the six driving power supplies supply power to the six driving power units of the three-phase upper bridge arm circuit and the three-phase lower bridge arm circuit of the driving unit respectively.

* * * * *